(12) United States Patent
Wu

(10) Patent No.: US 7,359,007 B2
(45) Date of Patent: Apr. 15, 2008

(54) SYSTEM FOR FORMAT CONVERSION USING CLOCK ADJUSTER AND METHOD OF THE SAME

(75) Inventor: Jen-Shi Wu, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 652 days.

(21) Appl. No.: 10/962,727

(22) Filed: Oct. 12, 2004

(65) Prior Publication Data

US 2006/0077288 A1  Apr. 13, 2006

(51) Int. Cl.
*H04N 7/01* (2006.01)

(52) U.S. Cl. .................. 348/581; 348/441; 348/558

(58) Field of Classification Search ............. 348/441, 348/581, 447–448, 458, 558, 554–555; 345/127, 345/131; *H04N 7/01*
See application file for complete search history.

(56) References Cited

U.S. PATENT DOCUMENTS

| | | | |
|---|---|---|---|
| 5,739,867 A | 4/1998 | Eglit | |
| 6,177,922 B1 | 1/2001 | Schiefer et al. | |
| 6,316,974 B1 | 11/2001 | Taraci et al. | |
| 6,441,658 B1 | 8/2002 | Taraci et al. | |
| 6,496,186 B1 | 12/2002 | Deering | |
| 6,545,688 B1 | 4/2003 | Loveridge et al. | |
| 6,611,260 B1 | 8/2003 | Greenberg et al. | |
| 6,642,968 B1 | 11/2003 | Ford et al. | |
| 7,034,812 B2 * | 4/2006 | Chen et al. | 345/204 |
| 7,091,967 B2 * | 8/2006 | Gong et al. | 345/213 |
| 7,133,053 B2 * | 11/2006 | Chen | 345/660 |
| 7,239,355 B2 * | 7/2007 | Smith et al. | 348/521 |
| 2001/0017631 A1 | 8/2001 | Oakley | |
| 2002/0126218 A1 | 9/2002 | Willis | |
| 2004/0085283 A1 | 5/2004 | Wang | |

FOREIGN PATENT DOCUMENTS

JP  2002010221 A2  1/2002

* cited by examiner

*Primary Examiner*—Trang U. Tran
(74) *Attorney, Agent, or Firm*—Hoffman, Warnick & D'Alessandro LLC

(57) ABSTRACT

A system and same method are provided for producing video signal timing to a display apparatus that has different input/output image/video format. In addition to an image scaler, the system comprises a clock adjuster including a first and a second clock generator. The first clock generator generates a first clock signal by which the input/source pixel data included in the input/source image frame are received. The second clock signal is generated and adjusted to have an average clock period such that the ratio of the input and output frame rates is substantially kept constant. Thus, the skew between the source/input images and the display/output images can be adjusted, and the output frame repeating and/or dropping can be avoided.

22 Claims, 4 Drawing Sheets

SYSTEM FOR FORMAT CONVERSION USING CLOCK ADJUSTER AND METHOD OF THE SAME

BACKGROUND OF THE INVENTION

1. Field of the Invention

This invention relates to video display systems. More particularly, the present invention is directed to a method and apparatus to convert a source image to a destination image, and is directed to a method and apparatus to produce video signal timing to a display apparatus that has an output/display video format different from an input video format.

2. Description of the Prior Art

There are numerous kinds of interlaced video signals such as NTSC and PAL, and progressive scan video signals such as VESA VGA, SVGA, XGA, and SXGA. Several methodologies have been adopted in the prior art method in order to accommodate different types of source video signals for viewing on a single display apparatus. And the prior art method involves converting resolution and the frame rate of source video signals which usually include a plurality of image frames/fields to a format which is supported by the display apparatus, such as LCDs, plasma display panels (PDPs), and TV sets.

In the display apparatus, there are usually a controller and a display screen, such as a flat panel display and a CRT monitor. The controller is provided for performing necessary video format conversion and related controlling functions. The buffer is provided for receiving and temporarily storing the source video signals. The display apparatus receives the image frames at an input frame rate, and outputs at an output frame rate after performing necessary video format conversion.

If the input and output frame or field rates do not match each other, the data transferred for displaying the output images will overflow or underflow in the buffer. Then, the picture displayed will come from two different frames. It is referred as "frame tear" problem. A solution to solve the "frame tear" problem adapted in the prior art is to drop or to repeat the input image frames/fields by the frame buffer. However, such a solution would generate objectionable temporal distortions in the output image frames/fields. This is not acceptable for high-quality display apparatuses.

If the display apparatus can lock the output frame/field rate to the input frame/field rate, there are significant advantages because image fields/frames no longer need to be repeated or dropped, and the aforementioned temporal distortion problem in the displaying sequence for the image frames/fields can be eliminated.

Furthermore, in case the display apparatus has different input and output frame/field rates, if we can also lock the output frame/field rate to a fractional multiple of input frame/field rate, the "frame tear" problem can be avoid and the frame repeating and dropping will be reduced. The frame repeating and dropping will be periodic and predictable.

Therefore, one objective of the present invention is to provide a method and corresponding apparatus for solving the above-mentioned problems.

SUMMARY OF THE INVENTION

One objective of the present invention is to provide a method and an apparatus for video signal conversion that can adjust the skew between the source/input video signal and the destination/output/display video signal.

Another objective of the present invention is to provide a method and an apparatus for video/image converting that can reduce or avoid the frame being repeated and dropped while the destination/output/display image frames/fields are being outputted.

Sill an objective of the present invention is to provide a method and an apparatus for video signal converting that can keep the ratio of the input and output frame rates. The ratio could be a constant, either an integer or a fraction.

The advantage and spirit of the invention could be better understood by the following recitations together with the appended drawings.

BRIEF DESCRIPTION OF THE APPENDED DRAWINGS

DETAILED DESCRIPTION OF THE INVENTION

Figure 1:
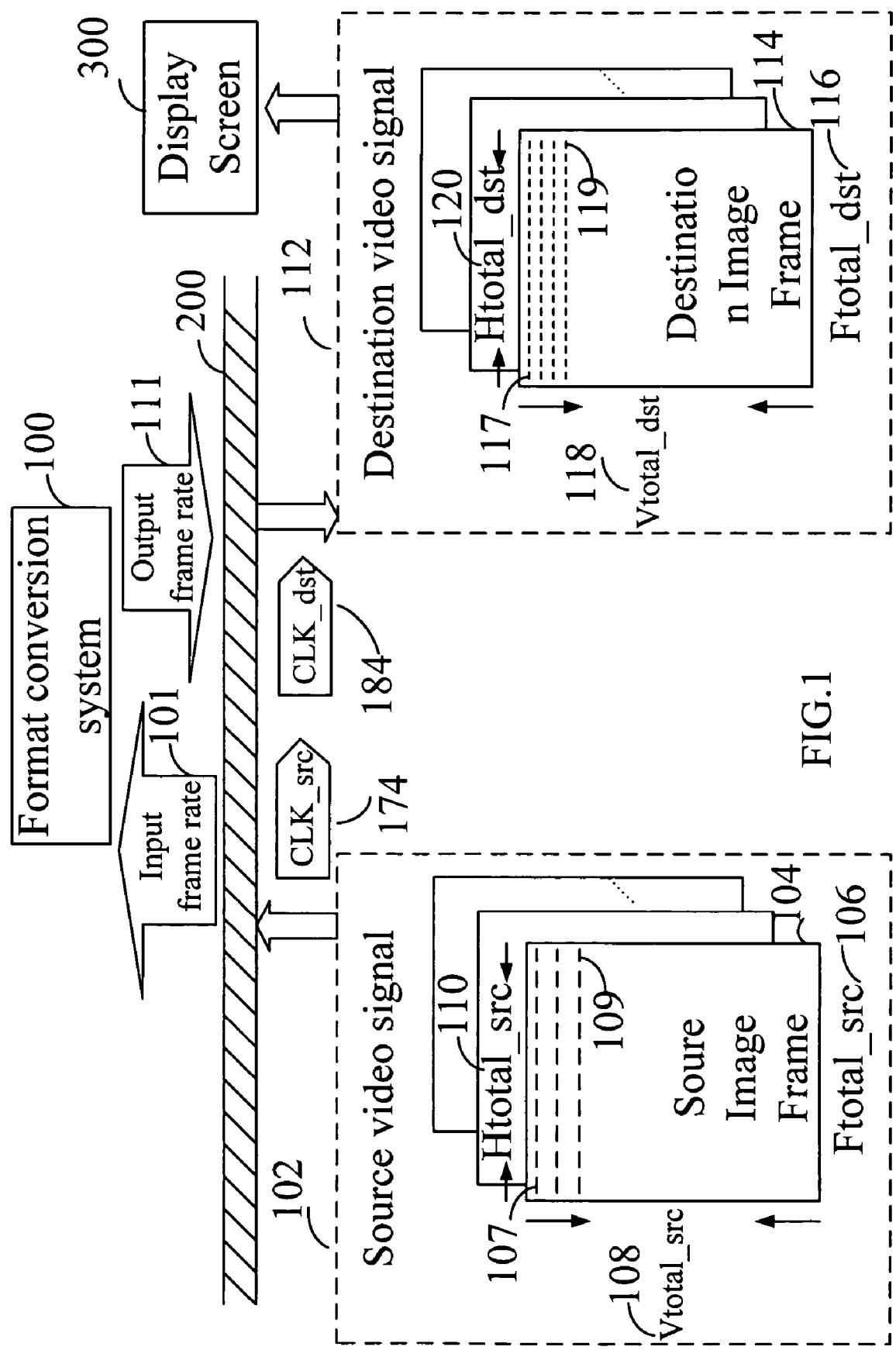
FIG. 1 shows the signal flow chart of the format conversion system according to one embodiment of the present invention.

FIG. 1 shows the signal flow chart of the format conversion system according to one embodiment of the present invention. In FIG. 1, the format conversion system 100 of the present invention receives a source video signal 102 from a signal line and/or a data bus 200. The source video signal 102 includes a plurality of source image frames 104 which are received by the format conversion system 100 at an input frame rate 101 and are extracted from the corresponding source video signal 102. Each source image frame 104 includes a plurality of source scan lines 107 and each source scan line 107 has a plurality of source pixel data 109. The source pixel data 109 are received with the aid of a first clock signal (CLK_src) 174. The source image frame 104 includes a plural predetermined source video parameters: a source frame rate (Ftotal_src) 106, a source vertical length (Vtotal_src) 108 which indicates the number of source scan lines 107 in one source image frame 104, and a source horizontal length (Htotal_src) 110 which indicates the number of source pixel data 109 in one source scan line 107. The resolution of the source image frame 104 is determined by the source vertical length (Vtotal_src) 108 and the source horizontal length (Htotal_src) 110.

After the video signal conversion function of the format conversion system 100 is performed, the system 100 outputs a destination video signal 112 to a display screen 300 for suitable and adjusted video/image displaying. The destination video signal 112 includes a plurality of destination image frames 114 which are outputted by the format conversion system 100 at an output frame rate 111. Each destination image frame 114 includes a plurality of destination scan lines 117 and each destination scan line 117 has a plurality of destination pixel data 119. The destination pixel data 119 are outputted with the aid of a second clock signal (CLK_dst) 184. The destination image frame 114 includes a plural predetermined destination video parameters: a destination frame rate (Ftotal_dst) 116, a destination vertical length (Vtotal_dst) 118 which indicates the number of destination scan lines 117 in one destination image frame 114, and a destination horizontal length (Htotal_dst) 120 which indicates the number of destination pixel data 119 in one destination scan line 117. The resolution of the destination image frame 114 is determined by the destination vertical length (Vtotal_dst) 118 and the destination horizontal length (Htotal_dst) 120.

When the desired resolution of the destination image frame 114 is higher than the original resolution of the source image frame 104, the format conversion system 100 would "upscale" the source image frame 104 in vertical and/or horizontal directions to generate the destination image frame 114. In contrast, when the desired resolution of the destination image frame 114 is lower than the original resolution of the source image frame 104, the present format conversion system 100 would "downscale" the source image frame 104 in vertical and/or horizontal directions to generate the destination image frame 114. The format conversion system 100 provides an efficient method for such video signal format/image resolution conversion and avoids the drawbacks introduced by the prior arts.

Figure 2:
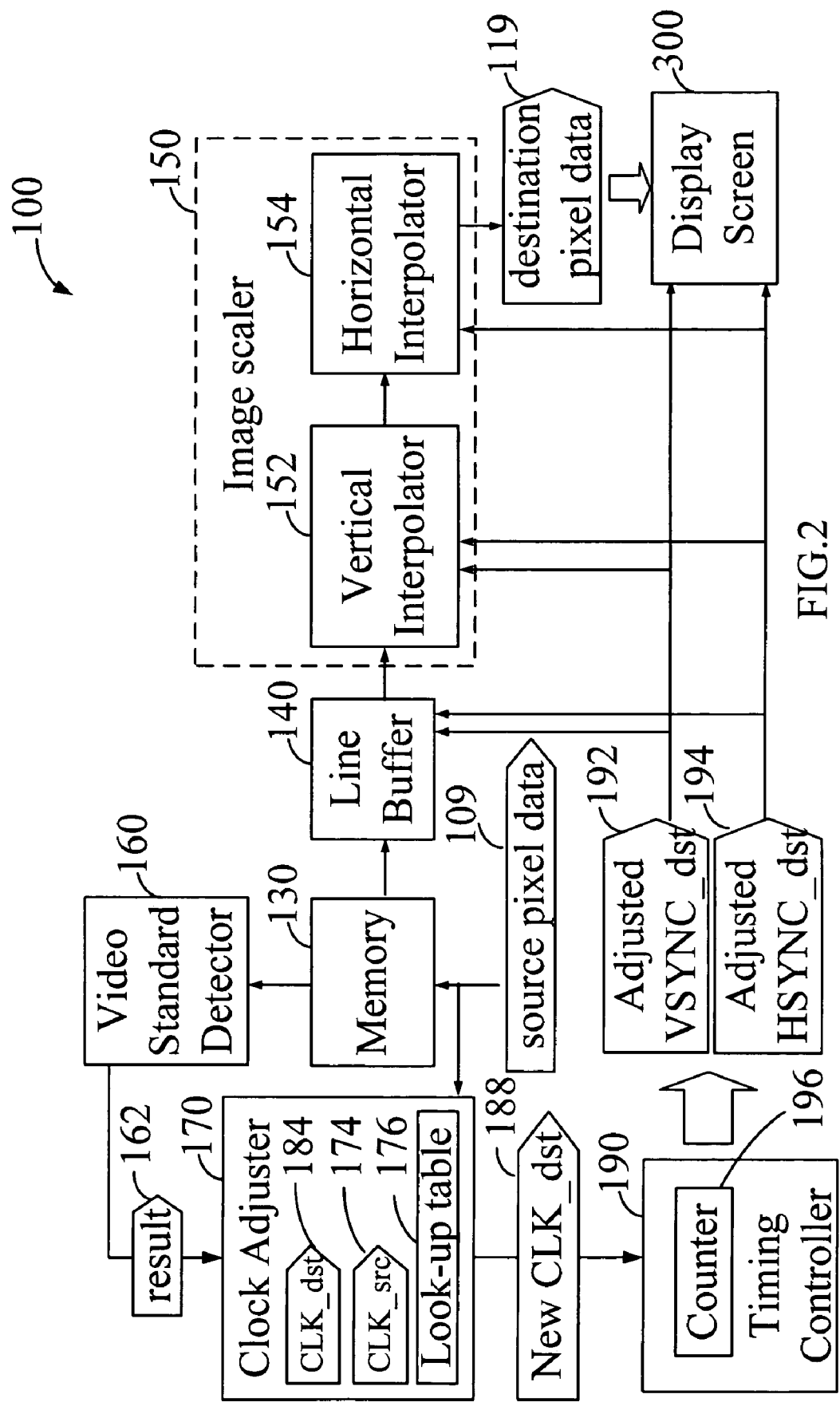
FIG. 2 shows the block diagram of the format conversion system according to the embodiment.

FIG. 2 shows the block diagram of the format conversion system 100 according to the embodiment. The format conversion system 100 includes a memory (for example: DRAM) 130, a video standard detector 160, a line buffer 140, an image scaler 150, a clock adjuster 170, and a timing controller 190. The memory 130 receives and stores the plural source pixel data 109, which are contained in the received source video signal 102 and are received by the aid of the first clock signal (CLK_src) 174. The incoming source video signal 102 could be defined as a specific video signal standard, for example: CCIR-656 NTSC, VGA 1280×1024@75, etc. Different video signal standards define different source frame rate (Ftotal_src), different source vertical length (Vtotal_src) and different source horizontal length (Htotal_src). The video standard detector 160 is employed to detect the source video signal and to identify video signal standard to which the incoming source video signal 102 belongs. The identified result 162 would then be forwarded to the clock adjuster 170. Based on the result 162, the clock adjuster 170 can refer to a look-up table 176 to find out the predetermined source video parameters of the source image frame 104, such as source frame rate (Ftotal_src), source vertical length (Vtotal_src) and source horizontal length (Htotal_src).

If the video signal standard of the source video signal is identified as NTSC, PAL, HDTV, VGA, or other types of video format, the source frame rate is their respectively specified (Ftotal_src) frame/second, the source vertical length is their respectively specified (Vtotal_src) lines/frame, and the source horizontal length can then be computed as CLK_src/(Ftotal_src*Vtotal_src) pixels/line. There are two examples as following:

|  | NTSC | PAL |
|---|---|---|
| Input CLK_src(MHz) | 13.5 | 13.5 |
| Ftotal_src(frame/sec) | 29.97 | 25 |
| Vtotal_src(lines/frame) | 525 | 625 |
| Computed Htotal_src(pixels/line) | 13500000/(29.97*525) = 858 | 13500000/(25*625) = 864 |

By referring to these parameters, the clock adjuster 170 can generate an adjusted and updated new clock signal (New CLK_dst) 188. The detailed function and operation of the clock adjuster 170 will be explained later in FIG. 4, and is skipped here to avoid redundancy. Based on the rendered and updated clock signal (New CLK_dst) 188, the timing controller 190 can output the adjusted horizontal synchronization signal (HSYNC_dst) 194 and the adjusted vertical synchronization signal (VSYNC_dst) 192 by counting based on the updated clock signal (New CLK_dst) 188. A counter 196 in the timing controller 190 would perform counting according to the destination video parameters: the destination horizontal length (Htotal_dst) 120 which indicates the number of destination pixel data 119 in one destination scan line 117, and the destination vertical length (Vtotal_dst) 118 which indicates the number of destination scan lines 117 in one destination image frame 114. The adjusted horizontal synchronization signal (HSYNC_dst) 194 and the adjusted vertical synchronization signal (VSYNC_dst) 192 are outputted for assisting the line buffer 140, the image scaler 150 and the display screen 300.

The line buffer 140 would then temporarily store the source pixel data 109 of the current source scan line/lines 107 from the memory 130 based on the adjusted HSYNC_dst signal 194 and the adjusted VSYNC_dst signal 192. The image scaler 150 includes a vertical interpolator 152 and a horizontal interpolator 154. The vertical interpolator 152 scales, either upscales or downscales, the source pixel data 109 of the source image frame 104 in the vertical direction based on the adjusted HSYNC_dst signal 194 and the adjusted VSYNC_dst signal 192. The horizontal interpolator 154 scales, either upscales or downscales, the source pixel data 109 of the source image frame 104 in the horizontal direction based on the adjusted HSYNC_dst signal 194. That is, the image scaler 150 scales the source pixel data 109 of the source image frame 104 in vertical and/or horizontal directions to generate the plural destination pixel data 119 representative of the destination image frame 114. Those destination pixel data 119 of the destination image frame 114 are displayed on the display screen 300 based on the adjusted second clock signal (New CLK_dst) 188. The vertical interpolation procedure employed in the vertical interpolator 152 and the horizontal interpolation procedure employed in the horizontal interpolator 154 are well-known for those skilled in the video/image processing art. No further detail is here provided for the interpolation operation in the vertical interpolator 152 and the horizontal interpolator 154.

The frequency relationship between the first clock signal (CLK_src) 174 and the second clock signal (CLK_dst) 184 can be expressed in the following equation (Equ.1):

$$\frac{CLK\_dst}{CLK\_src} = \frac{Ftotal\_dst * Vtotal\_dst * Htotal\_dst}{Ftotal\_src * Vtotal\_src * Htotal\_src} \quad (Equ. 1)$$

The period of the source horizontal synchronization signal (HSYNC_src) 175 is defined as (T_Hsrc), which is equal to the value of (Htotal_src) 110 divided by the frequency of the first clock signal (CLK_src) 174. The relationship is shown in the following equation (Equ.2):

$$T\_Hsrc = CLK\_src^{-1} * Htotal\_src \quad (Equ.2)$$

Similarly, the period of the destination horizontal synchronization signal (HSYNC_dst) is defined as (T_Hdst), which is equal to the value of (Htotal_dst) 120 divided by the frequency of the second clock signal (CLK_dst) 184. The relationship is shown in the following equation (Equ.3):

$$T\_Hdst = CLK\_dst^{-1} * Htotal\_dst \qquad (Equ.3)$$

Combining the equations of (Equ.1), (Equ.2) and (Equ.3), the relationship between the periods of (T_Hsrc) and (T_Hdst) can be expressed in the following equation (Equ.4):

$$T\_Hsrc = \frac{Ftotal\_dst * Vtotal\_dst}{Ftotal\_src * Vtotal\_src} * T\_Hdst \qquad (Equ.\ 4)$$

The ratio for (T_Hsrc) and (T_Hdst) can be defined as (Ftotal_dst*Vtotal_dst)/(Ftotal_src*Vtotal_src). That means, if we know the period of the source horizontal synchronization signal (HSYNC_src), all the required parameters (Ftotal_dst), (Vtotal_dst), (Ftotal_src) and (Vtotal_src) can be easily obtained and the period of the destination horizontal synchronization signal (HSYNC_dst) can be calculated by using the above equation (Equ.4).

However, because the incoming source video signal 102 might be instable and thus unpredictable, the source pixel data 109 of the source image frame 104 might not be stably received. This would also lead to variation of the first clock signal (CLK_src) 174. That means the first clock signal (CLK_src) 174 may be variant over time, and the input frame rate (or the input pixel rate) won't be always fixed. Therefore, we have to modify the second clock signal (CLK_dst) 184 according to the varied first clock signal (CLK_src) 174, so as to let the fixed ratio (Ftotal_dst*Vtotal_dst)/(Ftotal_src*Vtotal_src) be maintained. According to the above equation (Equ.4), once the input frame rate (or the input pixel rate) is changed, T_Hsrc must also be changed. If we can also modify T_Hdst, the fixed ratio can be maintained.

Figure 3:
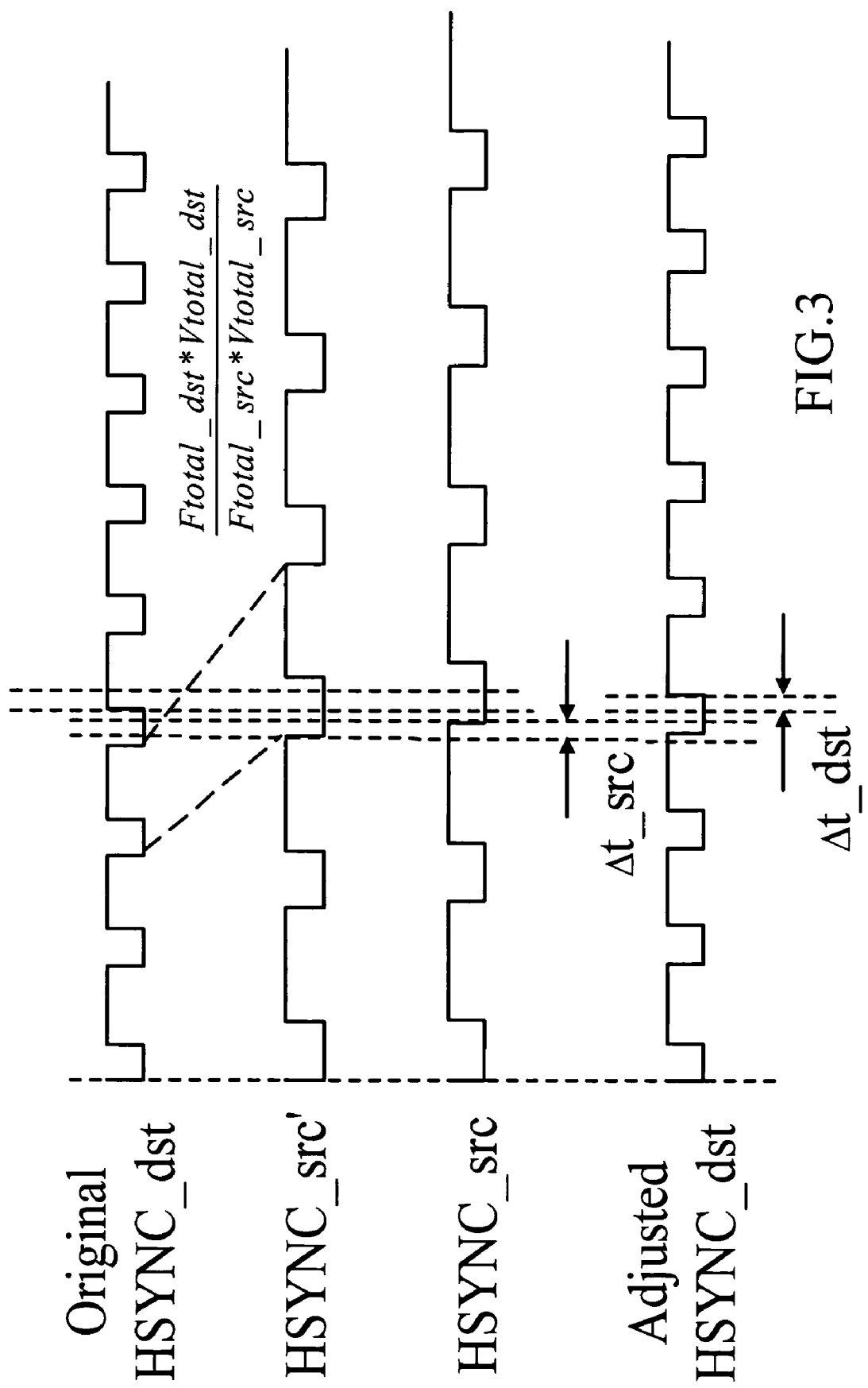
FIG. 3 shows the timing diagram of the original destination horizontal synchronization signal (HSYNC_dst), the estimated source horizontal synchronization signal (HSYNC_src'), the original source horizontal synchronization signal (HSYNC_src), and the adjusted destination horizontal synchronization signal (adjusted HSYNC_dst)

FIG. 3 shows the timing diagram of the original destination horizontal synchronization signal (HSYNC_dst), the estimated source horizontal synchronization signal (HSYNC_src'), the original source horizontal synchronization signal (HSYNC_src), and the adjusted destination horizontal synchronization signal (adjusted HSYNC_dst). The original destination horizontal synchronization signal (HSYNC_dst) can be generated if (Htotal_dst) is divined by (CLK_dst) 184. Equally, the original (HSYNC_src) can be computed by (Htotal_src) being divided by (CLK_src). According to (Equ.4), the estimated source horizontal synchronization signal (HSYNC_src') can be obtained by (Ftotal_dst*Vtotal_dst)/(Ftotal_src*Vtotal_src) times (T_Hdst). Here, (T_Hdst) varies with the changing of (CLK_dst)(or (New CLK_dst)). The changing of (CLK_dst) (or (New CLK_dst)) is generated by comparing (HSYNC_src') with (HSYNC_src). (HSYNC_src') and (HSYNC_src) are compared to obtain a phase difference (Δt_src) which represents the difference between them. With this phase difference (Δt_src), some signal feed-back mechanism can be designed and employed to minimize the phase difference (Δt_src), so as to generate the adjusted destination horizontal synchronization signal (adjusted HSYNC_dst), and accordingly the second clock signal (New CLK_dst). The signal (New CLK_dst) is generated by adjusting the original second clock signal (CLK_dst), so that the output frame/field rate can be locked to the input frame/field rate. The ratio of the input and output frame/field rates needs merely to be kept or locked around a constant over a period of time. That is, exactness at any given temporal moment is not necessary. Minor variation over this constant along the temporal axis, more or less, is acceptable. Such circuit design will be explained in the following paragraph associated with the clock adjuster 170 together with the present invention.

Figure 4:
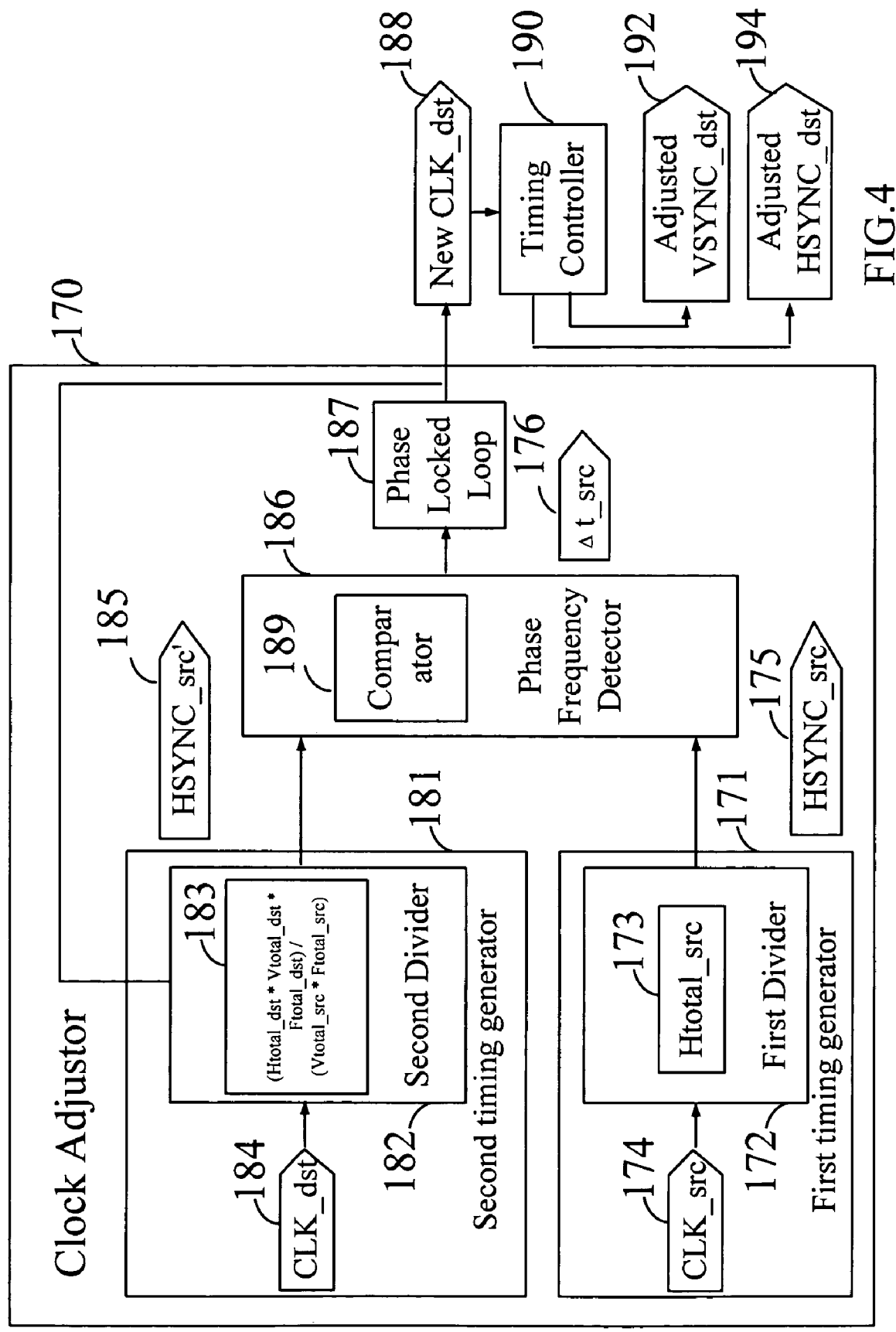
FIG. 4 shows the block diagram of the clock adjuster according to the present invention.

FIG. 4 shows the block diagram of the clock adjuster 170 in the embodiment. In FIG. 4, the detailed components associated with the clock adjuster 170 are depicted. The clock adjuster 170 is to generate an adjusted second clock signal (New CLK_dst) 188, such that by adjusting its second clock period (CLK_dst) the ratio of the input and output frame rates is substantially kept constant.

In an exemplary embodiment, the clock adjuster 170 includes a first timing generator 171, a second timing generator 181, a phase frequency detector (PFD) 186, and a phase locked loop (PLL) 187. By using this first clock signal (CLK_src) 174, the plural source pixel data 109 included in the source image frame 104 are received by the format conversion system 100. Because of the unpredictability and instability of the incoming source video signal 102, the source pixel data 109 of the source image frame 104 may not be well received. This would also lead to the variation of the first clock signal (CLK_src) 174. That means the period of the first clock signal (CLK_src) 174 might be variant over time. In the first timing generator 171, a first divider 172 is employed for dividing a first factor 173 by the first clock signal (CLK_src) to generate a source horizontal synchronization signal (HSYNC_src) 175. The first factor 173 is the source horizontal length (Htotal_src) which can be pre-stored in first divider 172. Furthermore, if there is a horizontal synchronization input accompanied with the video input, which is sampled by CLK_src, the first timing generator 171 uses this horizontal synchronization input instead of the output of first divider 172. In the second clock generator 181, a second divider 182 is employed for dividing a second factor 183 by the second clock signal (CLK_dst) 184 to generate an estimated source horizontal synchronization signal (HSYNC_src') 185. Here, the second clock signal can be generated by, for example, another local oscillator and is independent from the first clock signal (CLK_src). The second factor 185 is the value (Htotal_dst*Vtotal_dst*Ftotal_dst) Because the second factor 185 may be a fractional value, a fractional divider is preferred for the implementation of the second divider 182.

The source horizontal synchronization signal (HSYNC_src) 175 and the estimated source horizontal synchronization signal (HSYNC_src') 185 are forwarded to the phase frequency detector (PFD) 186. The phase frequency detector 186 includes a comparator 189 for comparing the estimated source horizontal synchronization signal (HSYNC_src') with the source horizontal synchronization signal (HSYNC_src) to obtain a phase difference (Δt_src) 176. Ideally, the phase difference (Δt_src) 176 is zero if the period of the first clock signal (CLK_src) 174 is not varied due to some reasons, for example: instability of the incoming source video signal 102. When the period of the first clock signal (CLK_src) 174 is not fixed in its due duration, the phase difference (Δt_src) 176 would be rendered. The phase difference (Δt_src) 176 is in proportion to the phase difference between the rising or falling edges of two signals (HSYNC_src) 175 and (HSYNC_src') 185.

The phase locked loop 187 is configured to receive the phase difference (Δt_src) 176 from the phase frequency detector 186. Using the obtained phase difference (Δt_src) 176, the phase locked loop 187 is able to adjust the clock period of the original second clock signal (CLK_dst) 184, so as to generate the adjusted second clock signal (New CLK_dst) 188. This can be achieved by feeding back the adjusted second clock signal (New CLK_dst) 188 to the second divider 183. Then, the adjusted second clock signal (New CLK_dst) 188 divide the second divider 183. Such signal feed-back mechanism is known and widely-employed in the art of signal processing field. With the signal feed-back mechanism, the obtained phase difference ($\Delta t\_src$) 176 would be gradually minimized and even reduced to zero over a short period of time. When the updated clock signal (New CLK_dst) 188 is generated, it can be provided to the timing controller 190 for outputting the adjusted horizontal synchronization signal (HSYNC_dst) 194 and the adjusted vertical synchronization signal (VSYNC_dst) 192 by counting based on the updated clock signal (New CLK_dst) 188. The destination pixel data 119 of the destination image frame 114 are therefore displayed on the display screen 300 based on the updated clock signal (New CLK_dst) 188.

It should be noted that the function of the first clock signal (CLK_src) in the embodiment could be external or internal. That means the embodiment can use the externally generated first clock signal (CLK_src), which is external to the source video signal 102, to receive the source pixel data 109. In addition, the embodiment could also use the internally contained or accompanied data valid signal (DATA_valid), which is internal to the source video signal 102, to receive the source pixel data 109. Both signals would work well pursuant to the spirit of the present invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of converting a source image frame to generate a destination image frame, the source image frame including a plurality of source scan lines having a plurality of source pixel data, the destination image frame including a plurality of destination scan lines having a plurality of destination pixel data, said method comprising the following steps of:
   receiving the plural source pixel data using a first clock signal (CLK_src);
   converting the plural source pixel data into the plural destination pixel data;
   generating an estimated source horizontal signal (HSYNC_src') based on a second clock signal (CLK_dst), wherein a clock period of the estimated source horizontal signal is substantially proportional to that of the second clock signal;
   comparing the estimated source horizontal signal with a source horizontal synchronization signal (HSYNC_src) to generate a comparing result, wherein the source horizontal synchronization signal is relative to the plurality of source scan lines;
   according to the comparing result, adjusting the second clock signal to generate an adjusted second clock signal; and
   providing the plural destination pixel data of the destination image frame using the adjusted second clock signal.

2. The method of claim 1, wherein the source image frame includes a plural predetermined source video parameters and is extracted from a corresponding source video signal, and after receiving the source video signal, the method detects the source video signal and identifies an video signal standard to which the source video signal belongs.

3. The method of claim 2, wherein the source video parameters are a source frame rate (Ftotal_src), a source vertical length (Vtotal_src) indicating the number of source scan lines in one source image frame, and a source horizontal length (Htotal_src) indicating the number of source pixel data in one source scan line.

4. The method of claim 3, wherein when the video signal standard of the source video signal is identified as one of specific types of video format, and wherein the source frame rate is Ftotal_src frame/second, the source vertical length is Vtotal—src lines/frame, and the source horizontal length is CLK_src/(Ftotal_src * Vtotal_src) pixels/line.

5. The method of claim 3, wherein the destination image frame includes a plural predetermined destination video parameters selected from the group consisting of a destination frame rate (Ftotal_dst), a destination vertical length (Vtotal_dst) indicating the number of destination scan lines in one destination image frame, a destination horizontal length (Htotal_dst) indicating the number of destination pixel data in one destination scan line, and combination thereof.

6. The method of claim 5, wherein the clock period of the estimated source horizontal signal is substantially [(Htotal_dst * Vtotal_dst * Ftotal_dst)/(Vtotal_src * Ftotal_src)] times that of the second clock signal.

7. The method of claim 1, wherein the comparing result is a phase difference ($\Delta t\_src$), and the second clock signal is adjusted such that the phase difference is minimized,
   adjusting the clock period of the second clock signal (CLK_dst) by using the obtained phase difference ($\Delta t\_src$), so as to minimize the obtained phase difference($\Delta t\_src$).

8. The method of claim 7, wherein a phase locked loop is utilized to generate the phase difference ($\Delta t\_src$), the second clock signal, and the estimated source horizontal signal.

9. The method of claim 1, wherein the adjusted second clock signal is provided to output a destination horizontal synchronization signal (HSYNC_dst) and a destination vertical synchronization signal (VSYNC_dst).

10. The method of claim 9, wherein a vertical interpolation procedure and/or a horizontal interpolation procedure are farther performed on the source pixel data of the source image frame to generate the destination pixel data of the destination image frame based on the destination horizontal synchronization signal (HSYNC_dst) and the destination vertical synchronization signal (VSYNC_dst).

11. The method of claim 1, wherein the source horizontal synchronization signal (HSYNC_src) is extracted from a source video signal corresponding to the source image frame or generated by dividing the first clock signal(CLK_src)by a source horizontal length (Htotal_src) indicating the number of source pixel data in one of the source scan lines.

12. A system for converting a source image frame to generate a destination image frame, the source image frame including a plurality of source scan lines having a plurality of source pixel data, the destination image frame including a plurality of destination scan lines having a plurality of destination pixel data, said system comprising:
   a timing generator, for generating an estimated horizontal signal (HYSNC_src') based on a second clock signal (CLK_dst), wherein a clock period of the estimated source horizontal signal is substantially proportional to that of the second clock signal;
   a comparator, for comparing the estimated source horizontal signal with a source horizontal synchronization signal (HSYNC_src) to generate a comparing result, the source horizontal synchronization signal being relative to the plurality of source scan lines;

an adjuster, for adjusting the second clock signal according to the comparing result to generate an adjusted second clock signal; and an image scaler for scaling the source image frame to generate the plural destination pixel data representative of the destination image frame;

wherein the system receives the plural source pixel data using a first clock signal (CLK_src) and provides the plural destination pixel data of the destination image frame using the adjusted second clock signal.

13. The system of claim 12, wherein the source image frame includes a plural predetermined source video parameters and is extracted from a corresponding source video signal, and wherein after the source video signal is received, a video standard detector is employed to detect the source video signal and to identify a specific video signal standard to which the source video signal belongs.

14. The system of claim 13, wherein the source video parameters are a source frame rate (Ftotal_src), a source vertical length (Vtotal_src) indicating the number of source scan lines in one source image frame, and a source horizontal length (Htotal_src) indicating the number of source pixel data in one source scan line.

15. The system of claim 14, wherein when the video signal standard of the source video signal is identified as one of specific types of video format, and wherein the source frame rate is Ftotal_src frame/second, the source vertical length is Vtotal_src lines/frame, and the source horizontal length is CLK_src/(Ftotal_src * Vtotal_src) pixels/line.

16. The system of claim 14, wherein the destination image frame includes a plural predetermined destination video parameters selected from the group consisting of a destination frame rate (Ftotal_dst), a destination vertical length (Vtotal_dst) indicating the number of destination scan lines in one destination image frame, a destination horizontal length (Htotal_dst) indicating the number of destination pixel data in one destination scan line, and combination thereof.

17. The system of claim 16, wherein the clock period of the estimated source horizontal signal is substantially [(Htotal_dst * Vtotal_dst * Ftotal_dst)/(Vtotal_src * Ftotal_src)] times that of the second clock signal.

18. The system of claim 12, wherein the comparing result is a phase difference ($\Delta t\_src$) and the second clock signal is adjusted such that the phase difference is minimized.

19. The system of claim 12, wherein the timing generator is a frequency divider.

20. The system of claim 12, the system further comprising a time controller for receiving the adjusted second clock signal (New CLK_dst) to output a destination horizontal synchronization signal (HSYNC_dst) and a destination vertical synchronization signal (VSYNC_dst).

21. The system of claim 12, the system further comprising:

a memory for storing the plural source pixel data;

a line buffer for temporarily storing the source pixel data of a current source scan line/lines from the memory;

a vertical interpolator for scaling the source pixel data of the source image frame in the vertical direction; and a horizontal interpolator for scaling the source pixel data of the source image frame in the horizontal direction.

22. The system of claim 12, wherein the source horizontal synchronization signal (HSYNC_src) is extracted from a source video signal corresponding to the source image frame or generated by dividing the first clock signal (CLK_src) by a source horizontal length (Htotal_src) indicating the number of source pixel data in one of the source scan lines.

* * * * *